United States Patent [19]

Patel et al.

[11] Patent Number: 5,068,273

[45] Date of Patent: Nov. 26, 1991

[54] THERMOSETTING COMPOSITION

[75] Inventors: Narendra M. Patel, Mount Pocono, Pa.; Leonard Di Leo, Belleville, N.J.

[73] Assignee: Sun Chemical Corporation, Fort Lee, N.J.

[21] Appl. No.: 545,440

[22] Filed: Jun. 27, 1990

[51] Int. Cl.$^5$ .......................... C08L 61/28; C08K 5/42
[52] U.S. Cl. .................................... 524/166; 525/442; 525/400
[58] Field of Search ................. 525/442, 400; 524/166

[56] References Cited

U.S. PATENT DOCUMENTS

| | | | |
|---|---|---|---|
| 3,538,057 | 11/1970 | Lafoe | 524/166 |
| 3,583,941 | 6/1971 | Trapasso et al. | 524/166 |
| 3,592,796 | 7/1971 | Trapasso et al. | 524/166 |
| 4,500,680 | 2/1985 | Singer et al. | 525/442 |
| 4,500,689 | 2/1985 | Thomas | 525/442 |
| 4,501,854 | 2/1985 | Singer et al. | 525/442 |

*Primary Examiner*—Kriellion S. Morgan
*Attorney, Agent, or Firm*—Jack Matalon

[57] ABSTRACT

A thermosetting composition comprising a mixture of a thermosettable polyester and an aminoplast resin together with an alkali metal sulfonate. The composition may also contain a pigment and a reactive diluent. The composition is useful as a coating or ink.

10 Claims, No Drawings

THERMOSETTING COMPOSITION

BACKGROUND OF THE INVENTION

This invention relates to thermosetting coating compositions containing at least one thermosettable polyester and an aminoplast resin together with a catalyst therefor comprising an alkali metal organosulfonate. This invention also relates to coatings and inks prepared from such compositions. Such inks are especially useful for imprinting metal containers e.g. beer cans, soda cans, etc.

Thermosetting coating compositions containing one or more thermosettable polyesters and an aminoplast resin are well known in the prior art. Typically, such prior art compositions are cured by means of acid catalysts. When such compositions are intended for use as coatings or inks, one or more pigments are added and the catalyst of universal choice is para toluene sulfonic acid ("PTSA"). However, coatings and inks prepared from such compositions have several disadvantages: (a) they require relatively high activation temperatures, e.g. 170°-200° C., thereby necessitating high energy costs and relatively low printing speeds; and (b) the compositions are not thoroughly cross-linked, and exhibit relatively poor resistance to abrasion and pasteurization (typically required for beer containers).

The disadvantages of the prior art compositions are overcome by use of an alkali metal sulfonate as the activation catalyst. Not only does the alkali metal sulfonate permit the use of lower activation temperatures, but many of the alkali metal sulfonates also possess excellent dispersing properties, thus resulting in better wetting of the pigment in the composition and thereby resulting in improved transferability of the coating or ink to the substrate, as well as improved flow properties.

DETAILS OF THE INVENTION

The thermosetting compositions of the present invention comprise a mixture of at least one thermosettable polyester and an aminoplast resin together with an alkali metal sulfonate.

The polyesters consist of the polycondensation products of polycarboxylic acids with polyhydroxy alcohols and will typically have hydroxy values of 40 to 250, preferably 100–150, as well as acid values of 2 to 20, preferably 5–15. Typically, the polycarboxylic acids employed in preparing the polyesters will be aliphatic or aromatic acids such as phthalic, isophthalic, pyromellitic, terphthalic, adipic, etc. and many monocarboxylic acids (e.g. pelargonic, caproic, lauric, isostearic, benzoic, etc.) may be added to make the composition tougher and more flexible.

The selected acids are condensed with polyhydroxy alcohols such as ethylene, propylene, diethylene, dipropylene or trimethylene glycols, pentaerythritol, glycerol, etc. as well as monoalcohols. For many coating applications, it may be desirable to use a mixture of polyesters, in order to "tailor" the abrasion resistance, flexibility, viscosity, etc. to the desired level.

The aminoplast resin serves as the crosslinking agent for the polyester. Aminoplast resins are a class of thermosetting resins prepared by reacting amido or amidino amines with an aldehyde. Suitable reactants include urea, ethylene urea, melamine, guanamines, etc. with glyoxal, formaldehyde, acetaldehyde, etc. The aminoplast resin will typically have an alkoxy (preferably methoxymethyl) content of 2 to 6 and a weight average molecular weight of 200 to 500, preferably 300 to 400.

The selected polyester(s) and aminoplast resin are mixed so as to result in a polyester:aminoplast resin in the range of 1:1 to 10:1, preferably 2:1 to 5:1.

For the purpose of this invention, the thermally-activated catalyst is an alkali metal organosulfonate. The alkali metal may be sodium (preferred), potassium or lithium, while the organo group may contain 1 to 22, preferably 8 to 18 carbon atoms. The organo group may be straight or branched-chain aliphatic, aromatic or heterocyclic in nature; preferably the organo group is alkyl or alkaryl group containing 8 to 18 carbon atoms. The alkali metal organosulfonate is generally utilized in an amount of 0.5 to 10 wt. %, preferably 3–7 wt. %, based on the weight of the composition.

For coating purposes, a diluent in the amount of 20 to 60 wt. % may be added to the composition. The diluent may be any liquid that will dissolve the polyester and aminoplast, e.g. alcohols, aromatic hydrocarbons, esters, ketones, etc. In those instances where a colored coating composition is desired, a pigment will be added. Any pigment conventionally employed for coatings may be added to the coating compositions of the present invention. The pigment is generally employed in an amount of 5 to 60 wt. %, based on the weight of the composition. Non-limiting examples of suitable pigments include yellows such as Yellow 1, Yellow 3, Yellow 12, Yellow 14, Yellow 17, Yellow 65, Yellow 73, Yellow 74 and Yellow 83; oranges such as Orange 5, Orange 13, Orange 16, Orange 36 and Orange 46; blues and greens such as Blue 15, Green 7 and Green 36; and reds such as Red 3, Red 17, Red 22, Red 23, Red 38, Red 48, Red 52, Red 53, Red 57, Red 60 and Red 63.

For printing ink purposes, the composition desirably includes a diluent to control viscosity and to assist in transferability of the ink to the substrate. Preferably, the diluent is one which is non-volatile at the desired curing temperature and is reactive with the components of the coating composition. Volatile, non-reactive diluents are undesirable from an environmental and safety point of view and also since they leave bubbles or cracks in the coating as they evaporate or they may be trapped between the outer surface of the ink coating and the overprint varnish which is typically added after the substrate has been imprinted. The diluent is typically used in an amount of 2 to 25 wt. %, preferably 2 to 20 wt. %, based on the weight of the coating composition. Examples of suitable reactive diluents include ethylene glycol, polypropylene glycol, butylene glycol, tridecyl alcohol, octyl alcohol, lauryl alcohol, octadecyl alcohol, octylene glycol, hexyl carbitol, and the like.

The coating compositions are applied to the desired substrate by spraying, air knife, curtain coating, roller coating, dipping, brushing, wiping, etc. and the coated substrate is then cured at elevated temperatures. In the case of inks, it has been found that the temperature required for curing, i.e. the activation temperature, ranges from about 130° C. to 155° C.

The following examples shall serve to illustrate the present invention:

A polyester was prepared by reacting under nitrogen, at a temperature of about 200° C., 34 parts of trimellitic anhydride with 48 parts of dipropylene glycol and 18 parts of tridecyl alcohol. The polyester which resulted had an acid value of 10 to 20 and a hydroxyl value of 80 to 250. Seventy-five parts of the polyester were admixed with 25 parts of hexakismethyoxymethyl melamine to form a clear solution.

To 100 g of the above solution were added 0.004 mole of each of the catalysts indicated in Table I below. An aliquot of 2.6 mg was placed in a stainless steel sample holder and heated under nitrogen in a Dupont 910 Differential Scanning Calorimeter to 300° C. at a rate of 10° C. per minute starting at room temperature.

TABLE I

| Sample No. | Catalyst | Activation Temp., °C. |
|---|---|---|
| 1 | None | 154.3 |
| 2 | PTSA | 172.9 |
| 3 | Dioctyl sodium sulfo succinate | 139.5 |
| 4 | Sodium, dodecylbenzene sulfonate | 141.7 |
| 5 | Disodium, m-benzene disulfonate | 146.2 |
| 6 | Sodium, butyl-napthalene sulfonate | 137.6 |
| 7 | Potassium methane sulfonate | 153.5 |

As may be seen from Table I, Samples 3–6 are clearly advantageous in respect to the activation temperatures obtained with PTSA or no catalyst. Sample 7, which is a less preferred catalyst, also exhibits an advantage over PTSA, but shows no significant advantage over no catalyst. However, many types of polyesters, especially those with high acid values, cannot be effectively cured in the absence of acid catalysts.

What is claimed is:

1. A thermosetting composition comprising:
   (a) a mixture of at least one thermosettable polyester and an aminoplast resin; and
   (b) at least one alkali metal organosulfonate as a catalyst for curing said mixture.

2. The composition of claim 1 wherein the polyester has a hydroxy value of 40 to 250 and an acid value of 2 to 20.

3. The composition of claim 1 wherein the aminoplast resin has an alkoxy content of 1 to 15 and a weight average molecular weight of 200 to 500.

4. The composition of claim 3 wherein the resin has a methoxymethyl content of 2 to 6.

5. The composition of claim 1 wherein the alkali metal is sodium, potassium or lithium and the organo group contains 1 to 22 carbon atoms.

6. The composition of claim 5 wherein the organo group is a $C_8$–$C_{18}$ alkyl group.

7. The composition of claim 1 wherein the ratio of polyester to aminoplast resin is in the range of 1:1 to 10:1.

8. The composition of claim 1 wherein the alkali metal organosulfonate is present in an amount of 0.5 to 10 wt. %, based on the weight of the composition.

9. The composition of claim 1 wherein a pigment is present in an amount of 5 to 60 wt. %, based on the weight of the composition.

10. The composition of claim 9 wherein a reactive diluent is present in an amount of 2 to 20 wt. %, based on the weight of the composition.

* * * * *